No. 765,638. Patented July 19, 1904.

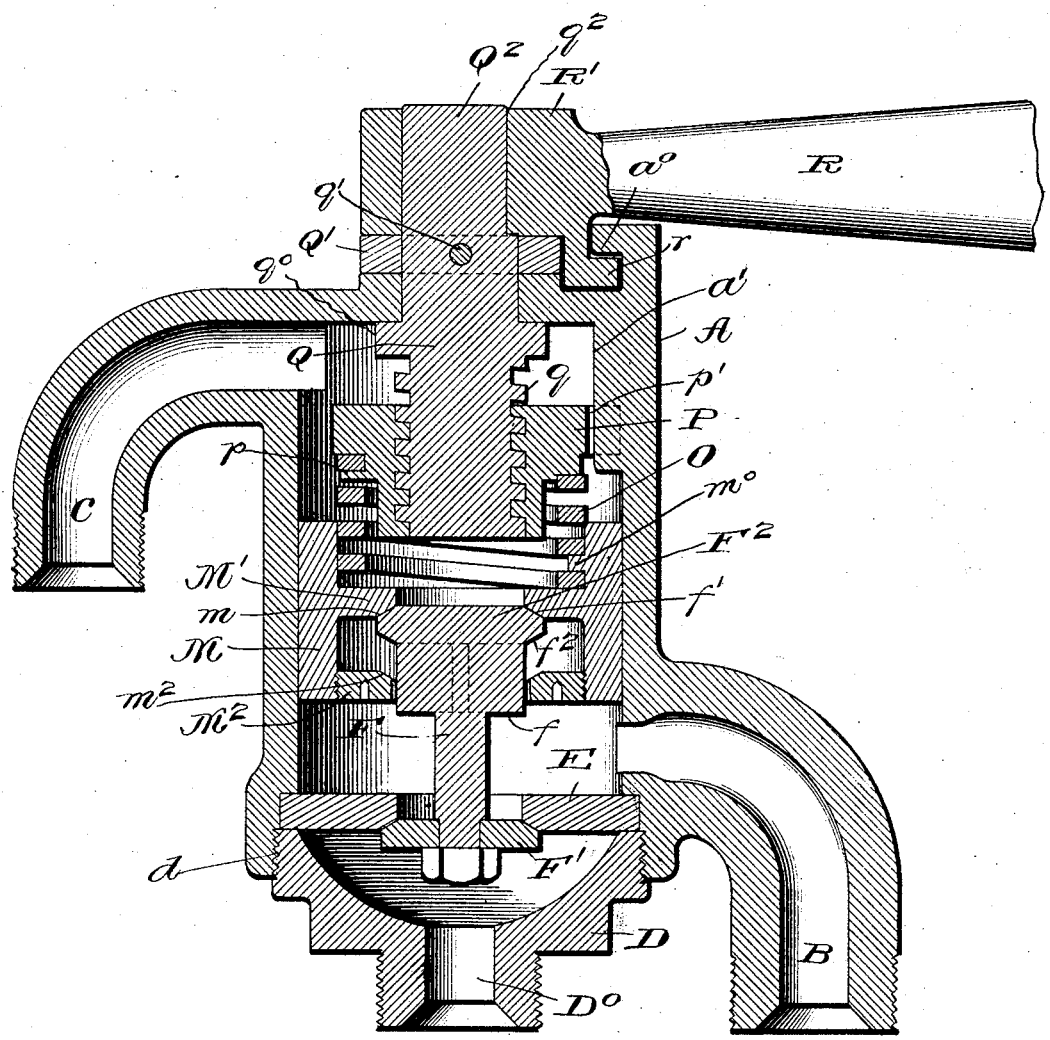

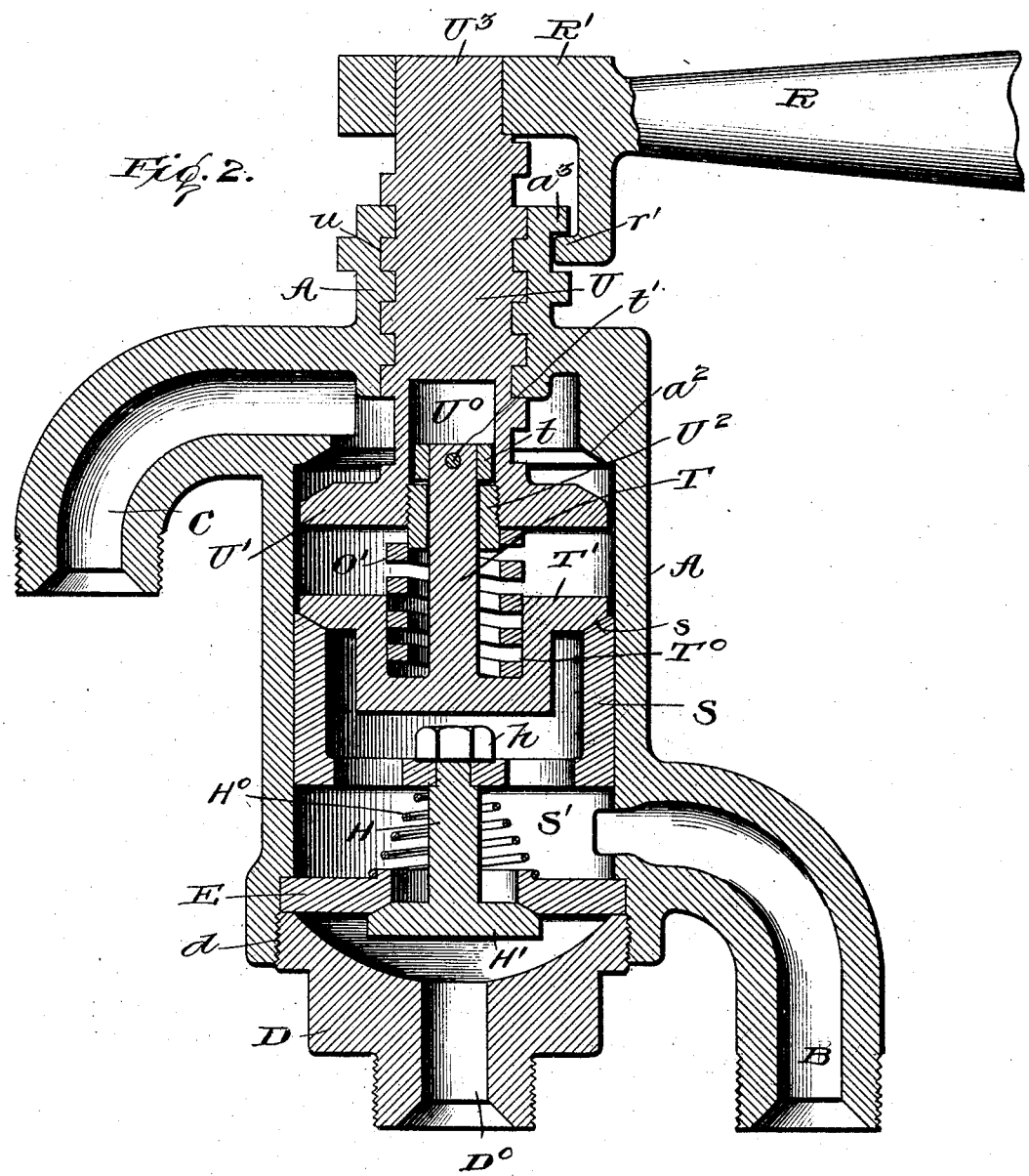

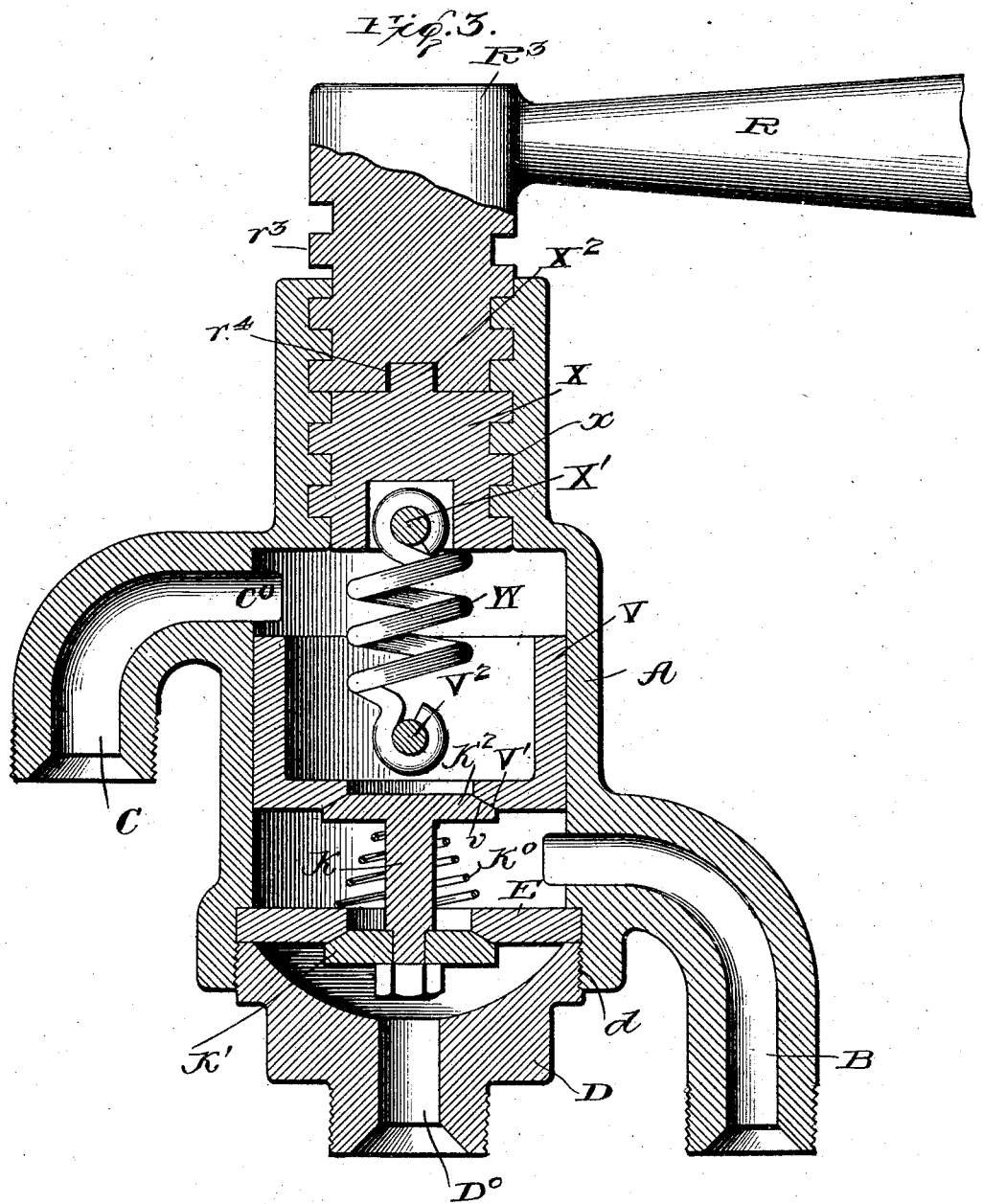

UNITED STATES PATENT OFFICE.

ADOLPH WILLIAM SCHRAMM, OF PHILADELPHIA, PENNSYLVANIA.

PRESSURE-REGULATING VALVE MECHANISM.

SPECIFICATION forming part of Letters Patent No. 765,638, dated July 19, 1904.

Application filed February 1, 1904. Serial No. 191,572. (No model.)

*To all whom it may concern:*

Be it known that I, ADOLPH WILLIAM SCHRAMM, a citizen of the United States, residing at Philadelphia, in the county of Philadelphia and State of Pennsylvania, have invented certain new and useful Improvements in Pressure - Regulating Valve Mechanism; and I do hereby declare the following to be a full, clear, and exact description of the invention, such as will enable others skilled in the art to which it appertains to make and use the same.

My invention applies to those braking systems in which the brake is applied by the direct action of the pressure in the train-pipe leading to the brake-cylinder.

The object of my invention is to provide a brake-valve operated by a single handle, the position of which determines the pressure in the brake-cylinder or train-pipe, the off or zero position being such that when the handle is placed thereat the brake can be operated in like manner from another point.

It is well known that pressure-regulating valves have been made which control the pressure in the brake-cylinder more or less perfectly; but all of them, as far as I am aware, have been of the engineers' valve type—that is, only one can be used on a system. Such engineers' valves are not adapted for operating, for instance, an electric car from either end, nor on a series of cars, such as an electric car and its trailers.

My invention will be understood by reference to the accompanying drawings, in which similar parts are indicated by similar letters throughout the several views.

Figure 1 is a central vertical section showing one form of the valve mechanism. Fig. 2 is a similar section showing another form. Fig. 3 is a similar section showing a third form.

The three figures represent somewhat different constructions which, however, perform the same functions and attain the same end. It will also be understood that the details of construction may be further changed without materially affecting the function or the operation of the several parts.

A (shown in all the figures) represents the valve-casing, which is connected by a suitable outlet B to the brake-cylinder (not shown) and by a suitable outlet C to the atmosphere. The end of the valve-casing in all the figures is closed by a screw-plug D, which is provided with a passage $D^0$, connected to the supply-tank or source of fluid-pressure. The parts B, C, and D are screw-threaded at their outer ends to engage suitable connections, (not shown,) while the part D is screw-threaded, as at $d$, to engage corresponding screw-threads on the interior of the valve-casing. This screw-plug D not only closes the outer end of the valve-casing, but also holds in place the annular valve-seat E, on which is seated the valve which admits fluid-pressure from the supply-tank to the brake-cylinder.

So far as it has already been described the construction of the invention is substantially identical.

It will now be necessary to refer to the various figures separately.

Referring first to Fig. 1, F represents a valve-stem, carrying at its lower end the admission-valve $F'$, which controls the admission of fluid-pressure to the brake-cylinder. This valve is normally kept upon its seat by the fluid-pressure in the passage $D^0$. The opposite end of the valve-stem F carries the valve $F^2$, which is shouldered, as at $f'$ and $f^2$, to seat alternately on the valve-seat $m$ of the annular diaphragm $M'$ of the hollow piston M and also upon the annular diaphragm $M^2$, which is provided with the valve-seat $m^2$. This annular diaphragm $M^2$ is preferably screwed into the hollow piston M for convenience in assembling the parts. On the upper face of the diaphragm $M'$ the spring O presses, which spring has one end secured to the hollow piston M, as at $m^0$, and the other end secured to the sliding nut P, as at $p$. This nut is held against turning in the valve-casing by any suitable engagement, as by a yoke $p'$ engaging a rib $a'$ in the interior of the valve-casing. Engaging in this nut P is a screw Q, which is screw-threaded, as at $q$, and is provided with a flange $q^0$, which bears against the upper wall of the valve-casing. $Q'$ is a washer which is secured in any convenient way, as by means of the pin $q'$, to the screw Q, and thus this washer Q' and the flange $q^0$ while allowing the screw Q to be revolved holds the same against longitudinal movement. The head $Q^2$ of the screw Q is squared, as at $q^2$, to receive the socket R' of the hand-lever R. It will be obvious that the head of this screw may be splined or otherwise held against turning in the socket R' of the handle R. To hold the handle in place during the normal operation of the valve, I preferably provide a bayonet-joint engagement, such as is shown at $r$ and $a^0$. This prevents the handle from being accidentally removed, but renders it possible to remove the same when desired.

The method of operation of the valve mechanism is as follows: Assuming that an air-brake system is being used and the pressure in the passage $D^0$ is maintained at, say, fifty pounds by the supply-tank and assuming that the admission-valve F' is on its seat and that the pressure in the passage B and its connections is that of the atmosphere and that the release-valve $F^2$ is also on or nearly on its seat $m$, all as shown in Fig. 1, and that the spring O is free, the parts will then be in the ordinary running position. If now it is desired to apply the brakes moderately at, say, twenty-five pounds in the brake-cylinder, the handle R is turned through a given angle, thus turning the screw Q, which being screw-threaded presses down the nut P, compressing the spring O and causing this spring to force the piston M downward. This will force the admission-valve F' off its seat, thus admitting air to the passage B and thence to the brake-cylinder. This air-pressure also acts on the under side of the piston M and the release-valve $F^2$, forcing them upward and compressing the spring O, and when the upward pressure of the air on the valve and piston slightly overbalances the downward pressure of the spring O the valve and piston will move upward again, automatically closing the admission-valve F'. Should the pressure in the passage B fall, due to a leaky brake-piston or other causes, the upward pressure on the piston M and the release-valve $F^2$ will lessen, allowing the spring O to force the piston down and to open the admission-valve F' again, and thus admitting more air from the supply-tank to the passage B. If the pressure in the passage B rises, due to a leaky admission-valve F' or other causes, this increased pressure acts on the under side of the piston M. The spring O is then compressed until the piston moves slightly away from the release-valve $F^2$, and the excess of pressure escapes by the release-valve and to the atmosphere through the passage C. Thus it will be seen that the pressure in the passage B is controlled by the compression of the spring O and that this compression may be varied at will by turning the handle R to a greater or less angle. Thus to increase the pressure in the brake-cylinder the handle is turned farther. To decrease this pressure, the handle is turned backward somewhat, while to remove the pressure altogether the handle is turned back to the initial or zero position. At each position of the handle R the compression of the spring O automatically adjusts the pressure in the passage B. To release the brakes entirely, it is only necessary to turn the handle R until the spring O is free, and all the pressure above that of the atmosphere will be allowed to escape past the valve $F^2$ and through the passage C. When this takes place, the admission-valve F' will reseat itself and the parts will be in the position shown in Fig. 1. Now if it is desired to operate the brakes from another portion of the car or train the handle R is detached and applied to a similar valve mechanism located at that portion of the car or train. It will be obvious that different handles may be applied to different valve mechanisms; but as a precautionary measure it is safer to remove the handle before leaving the valve mechanism, so that mischievous or ignorant persons may not apply the brakes, either purposely or by accident.

In order to turn the handle far enough backward to release the same, it becomes necessary to turn it back beyond the zero-point, thus allowing the air-pressure in the passage B to escape and releasing the spring O. Now if any pressure be admitted to the brake-cylinder from another station part of this pressure will flow through the passage B into the space beneath the piston M, which piston will rise until the valve-seat $m^2$ engages the locking-valve face $f^2$, shutting off any appreciable escape of fluid-pressure past the valve-faces $f^2$ and $f'$. It will be seen that the valve-face $f'$, coacting with its seat $m$, constitutes, in effect, one valve, the release-valve, while the valve-face $f^2$, coacting with its seat $m^2$, constitutes, in effect, another valve, which I have called the "locking-valve," its purpose being to lock the system as far as the local valve mechanism is concerned.

The operation of the form of device shown in Fig. 2 is substantially the same as that described with reference to Fig. 1, except that the arrangement and disposition of the parts is varied slightly. In these figures H represents a valve-stem, which carries at one end the admission-valve H', which valve is normally kept on its seat by the weak spring $H^0$. This valve-stem H is attached to the hollow piston S by means of the nut $h$, which is above the spider S'. The upper end of this piston S is provided with a valve-seat $s$, on which is seated the release-valve T', which is carried by the valve-stem T. This release-valve is provided with an annular chamber $T^0$, in which is mounted the coil-spring O', which coil-spring abuts against the lower face of the valve U', carried by the screw-stem U. This valve-stem is provided with a chamber $U^0$, into which projects the ring $t$, secured to the head of the valve-stem T, as by means of a pin $t'$. The screw-collar $U^2$ is loose on the valve-stem T and is screwed into the valve U'. Thus it will be seen that this valve-stem T has a limited play with regard to the screw-stem U. This screw-stem U is screw-threaded, as at $u$, to engage in corresponding female threads in the valve-casing A. The socket R' of the handle R fits on the head $U^3$ of this screw U, and the parts $a^3$ and $r'$ of the valve-casing and the handle, respectively, prevent the handle R from being accidentally disengaged from the screw-head, except when it is desired to remove the handle altogether, which is done in the same way as referred to with regard to Fig. 1. The valve-casing A is provided with a valve-seat $a^2$ in its upper portion to engage the valve U' when the latter is seated. It will be seen that when the spring O' is free the pressure in the passage $D^0$ will keep the admission-valve H' on its seat, and any pressure in the passage B above that of the atmosphere will lift the valve T', allowing such excess of pressure to pass by the valve U' and to escape to the atmosphere through the passage C. If now the spring O' be put under compression, as by turning the handle R, it will force the piston S down, temporarily opening the admission-valve H'. As soon as the pressure above the admission-valve is sufficient to slightly more than counterbalance the downward effect of the spring O' the piston S will move up again, closing the admission-valve H', and thus maintaining a pressure in the passage B dependent upon the amount of compression of the spring O'. If the pressure falls in the passage B from leaks or other cause, the spring O' will again open the admission-valve H', allowing additional pressure to flow in from the passage $D^0$ to the passage B until the equilibrium is again reëstablished. If the pressure in the passage B rises from any cause, as due to a leaky admission-valve, the release-valve T' will be temporarily lifted against the action of the spring O', causing the excess of pressure to escape to the atmosphere.

To detach the handle R from the mechanism shown in either Fig. 1 or Fig. 2, it is necessary to turn said handle so that its projecting piece $r$ or $r'$ clears the corresponding piece $a^3$ of the casing A. These parts are so arranged that the latter occurs only when the locking-valve (represented by the valve $f^2$ in Fig. 1 and U', Fig. 2) has been brought into contact with its seat, (indicated by $m^2$ or $a^2$, respectively.) In this position air is prevented, no matter what its pressure may be, from escaping from the passage B through the passage C to the atmosphere, and therefore permits the operation of the brakes from another part of the system. It is evident that in order to arrive at the detaching position, where the handle can be removed, it is necessary to pass through the intermediate or release position, where the release-valve will open, and thus before the handle is removed the brakes will be released. This is especially important if the car or train is standing on a grade, for it is then necessary to apply the hand-brake at the time that the handle R is removed. This feature naturally provides against the careless leaving of the car with the air-brakes only on, in which event the brakes might become released, due to the fall of pressure in the supply-tank, and the car would then be without any brakes on.

In the form of device shown in Fig. 3 the admission-valve K' and the release-valve $K^2$ are attached to the stem K and are normally kept upon their seats by the spring $K^0$. The piston V has a valve-seat $v$ in the annular web V', which presses on the release-valve $K^2$. W represents a stout coil-spring which is secured by the pin $V^2$ to the piston V and by the pin X' to the screw X, which is screw-threaded, as at $x$, to engage in corresponding female screw-threads in the casing A, which is provided with an angular head $X^2$, which engages in the corresponding socket $r^4$ in the screw $R^3$, which is preferably made integral with the handle R. This screw is provided with suitable threads $r^3$, corresponding to the threads $x$. The passage C is cut inward into the casing somewhat, as shown at $c^0$, and above the same is a valve-seat $a^4$, which is covered by the piston V when the said piston is raised to the upward limit of its travel, and thus this piston and the valve-seat $a^4$ operate in the same way as the locking-valve already described with reference to Figs. 1 and 2. In this form of device the handle R cannot be removed until the screw X is screwed up high enough to cause the piston V to seat, as at $a^4$, and to close the passage $c^0$. The operation of the admission and release valves as controlled by the compression of the spring W is precisely the same as that which has already been described with reference to Figs. 1 and 2.

While this invention herein described is primarily designed for use for braking purposes, it is evidently applicable to many purposes in which a definite but controllable pressure must be maintained in a pipe system in which it is desired that the control may be located at any one of a number of points.

It will be obvious that various modifications in the herein-described apparatus might be made which could be used without departing from the spirit of my invention.

Having thus described my invention, what I claim, and desire to secure by Letters Patent of the United States, is—

1. In a pressure-controlling valve mechanism, the combination with a handle, of an admission-valve, a spring-controlled release-valve and a locking-valve all operated by said handle, substantially as described.

2. In a pressure-controlling valve mechanism, the combination with a handle, of an admission-valve, a release-valve and a locking-valve, a piston controlling the closing of said release and locking valves, and a spring controlling the movement of said piston, all operated by said handle, substantially as described.

3. In a pressure-controlling valve mechanism, the combination with a casing and a handle mounted thereon, of an admission-valve, a release-valve and a locking-valve, a piston controlling the closing of said release and locking valves, and a spring controlling the movement of said piston, all operated by said handle, with means for locking said handle to said casing so that it can only be removed when the locking-valve is on its seat, substantially as described.

4. In a pressure-controlling valve mechanism, the combination with a casing and a handle mounted thereon, of an admission-valve, a release-valve, a locking-valve and a stem, a piston controlling the closing of said release and locking valves and a spring controlling the movement of said piston, all operated by said handle, with means for locking said handle to said casing, so that it can only be removed when the locking-valve is in its closed position, substantially as described.

5. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a release-valve controlling the escape of fluid-pressure to the atmosphere, and a locking-valve for cutting out the operation of the valve mechanism aforesaid, with means operated by hand for controlling all of said valves, substantially as described.

6. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a release-valve controlling the escape of fluid-pressure to the atmosphere, and a locking-valve for cutting out the operation of the valve mechanism aforesaid, with a handle and stem for operating all of said valves when desired, substantially as described.

7. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a release-valve controlling the escape of fluid-pressure to the atmosphere, and a locking-valve for cutting out the operation of the valve mechanism aforesaid, with a handle, and means controlled thereby for operating all of said valves from said handle when desired, substantially as described.

8. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a release-valve controlling the escape of fluid-pressure to the atmosphere, and a locking-valve for cutting out the operation of the valve mechanism aforesaid, a handle, a spring compressed by the movement of said handle, and means controlled by said handle and spring for operating all of said valves by said handle when desired, substantially as described.

9. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a release-valve controlling the escape of fluid-pressure to the atmosphere, and a locking-valve for cutting out the operation of the valve mechanism aforesaid, a handle, a screw-stem, a spring compressed by the turning of said handle and stem, and means controlled by said handle and spring for operating all or any of said valves when desired, substantially as described.

10. In a pressure-controlling valve mechanism, the combination with a handle, and a screw-threaded stem attached thereto, of an admission-valve, a spring-controlled release-valve and a locking-valve all operated by said stem, substantially as described.

11. In a pressure-controlling valve mechanism, the combination with a handle and a screw-threaded stem attached thereto, of an admission-valve, a release-valve and a locking-valve, a piston controlling the closing of said release and locking valves, and a spring controlling the movement of said piston, all operated by said stem, substantially as described.

12. In a pressure-controlling valve mechanism, the combination with a casing, a screw-threaded stem mounted in said casing, and a handle secured thereto, of an admission-valve, a release-valve and a locking-valve, a piston controlling the closing of said release and locking valves, and a spring controlling the movement of said piston, with means for locking said handle to said casing, so that it can only be removed when the locking-valve is in its closed position, substantially as described.

13. In a pressure-controlling valve mechanism, the combination with a casing, a screw-threaded stem mounted in said casing, and a handle attached thereto, of an admission-valve, a release-valve and a locking-valve, a piston controlling the closing of said release and locking valves and a spring controlling the movement of said piston, all operated by said stem, with means for locking said handle to said casing, so that it can only be removed when the locking-valve is on its seat, substantially as described.

14. In a pressure-controlling valve mechanism, the combination with a handle, of an admission-valve, a spring for holding said valve to its seat, a spring-controlled release-valve, and a locking-valve, all of said valves being operated by said handle, substantially as described.

15. In a pressure-controlling-valve mechanism, the combination with a handle, of an admission-valve, a spring for holding said admission-valve to its seat, a release-valve and a locking-valve, a piston controlling the closing of said release and locking valves, and a spring controlling the movement of said piston, all of said valves and also said piston being operated by said handle, substantially as described.

16. In a pressure-controlling valve mechanism, the combination with a casing, and a handle mounted thereon, of an admission-valve, a spring for holding said admission-valve to its seat, a release-valve and a locking-valve, a piston controlling the closing of said release and locking valves, and a spring controlling the movement of said piston, with means for locking said handle to said casing, so that it can only be removed when the locking-valve is in its closed position, substantially as described.

17. In a pressure-controlling valve mechanism, the combination with a casing and a handle mounted thereon, of an admission-valve, a spring for holding said admission-valve to its seat, a release-valve and a locking-valve, a piston controlling the closing of said release and locking valves, and a spring controlling the movement of said piston, all controlled by said handle, with means for locking said handle to said casing so that it can only be removed when the locking-valve is on its seat, substantially as described.

18. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a spring normally holding said admission-valve to its seat, a release-valve controlling the escape of fluid-pressure to the atmosphere, and a locking-valve for cutting out the operation of the valve mechanism aforesaid, with means operated by hand for controlling all of said valves, substantially as described.

19. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a spring normally holding said admission-valve to its seat, a release-valve controlling the escape of fluid-pressure to the atmosphere, and a locking-valve for cutting out the operation of the valve mechanism aforesaid, with a handle and stem for operating all of said valves when desired, substantially as described.

20. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a spring normally holding said admission-valve to its seat, a release-valve controlling the escape of fluid-pressure to the atmosphere, and a locking-valve for cutting out the operation of the valve mechanism aforesaid, with a handle, and means controlled thereby for operating all of said valves from said handle when desired, substantially as described.

21. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a spring normally holding said admission-valve to its seat, a release-valve controlling the escape of fluid-pressure to the atmosphere, and a locking-valve for cutting out the operation of the valve mechanism aforesaid, a handle, a spring compressed by the turning of said handle, and means controlled by said handle and spring for operating all of said valves by said handle when desired, substantially as described.

22. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a spring normally holding said admission-valve to its seat, a release-valve controlling the escape of fluid-pressure to the atmosphere, and a locking-valve for cutting out the operation of the valve mechanism aforesaid, a handle, a screw-stem, a spring compressed by the turning of said handle and stem, and means controlled by said handle and spring for operating all or any of said valves when desired, substantially as described.

23. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a release-valve controlling the escape of fluid-pressure to the atmosphere, and a locking-valve for cutting out the operation of the valve mechanism aforesaid, a piston mounted in said casing and controlling the closing of said release-valve and said locking-valve, with means operated by hand for controlling said piston and all of said valves, substantially as described.

24. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a release-valve controlling the escape of fluid-pressure to the atmosphere, and a locking-valve for cutting out the operation of the valve mechanism aforesaid, a piston mounted in said casing and controlling the closing of said release-valve and said locking-valve, with a handle and stem for operating said piston and all of said valves when desired, substantially as described.

25. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a release-valve controlling the escape of fluid-pressure to the atmosphere, and a locking-valve for cutting out the operation of the valve mechanism aforesaid, a piston mounted in said casing and controlling the closing of said release-valve and said locking-valve, with a handle, and means controlled thereby for operating said piston and all of said valves from said handle when desired, substantially as described.

26. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a release-valve controlling the escape of fluid-pressure to the atmosphere, and a locking-valve for cutting out the operation of the valve mechanism aforesaid, a piston mounted in said casing and controlling the closing of said release-valve and said locking-valve, a handle, a spring compressed by the turning of said handle, and means controlled by said handle and spring for operating said piston and all of said valves by said handle when desired, substantially as described.

27. In a pressure-controlling valve mechanism, the combination with a source of fluid-pressure, and a casing provided with separate passages connected to said source of fluid-pressure, to the mechanism to be operated, and to the atmosphere, respectively, of an admission-valve controlling the influx of fluid-pressure from said source, a release-valve controlling the escape of fluid-pressure to the atmosphere, and a locking-valve for cutting out the operation of the valve mechanism aforesaid, a piston mounted in said casing and controlling the closing of said release-valve and said locking-valve, a handle, a screw-stem, a spring compressed by the turning of said handle and stem, and means controlled by said handle and spring for operating said piston and all or any of said valves when desired, substantially as described.

In testimony whereof I affix my signature in presence of two witnesses.

ADOLPH WILLIAM SCHRAMM.

Witnesses:
R. S. REED,
IDA M. BROADBENT.